US007230765B2

(12) United States Patent
Yamamoto

(10) Patent No.: US 7,230,765 B2
(45) Date of Patent: Jun. 12, 2007

(54) IMAGE DISPLAY DEVICE

(75) Inventor: Masao Yamamoto, Tokyo (JP)

(73) Assignee: Scalar Corporation, Tokyo (JP)

( * ) Notice: Subject to any disclaimer, the term of this patent is extended or adjusted under 35 U.S.C. 154(b) by 19 days.

(21) Appl. No.: 10/524,107

(22) PCT Filed: Aug. 12, 2003

(86) PCT No.: PCT/JP03/10230

§ 371 (c)(1),
(2), (4) Date: Feb. 10, 2005

(87) PCT Pub. No.: WO2004/017121

PCT Pub. Date: Feb. 26, 2004

(65) Prior Publication Data

US 2005/0243431 A1 Nov. 3, 2005

(30) Foreign Application Priority Data

Aug. 12, 2002 (JP) ............................. 2002-235141
Mar. 4, 2003 (JP) ............................. 2003-057782
Mar. 4, 2003 (JP) ............................. 2003-057783

(51) Int. Cl.
G02B 27/14 (2006.01)
G09G 5/00 (2006.01)
G02C 3/00 (2006.01)

(52) U.S. Cl. ..................... 359/630; 359/632; 345/7; 345/8; 351/157

(58) Field of Classification Search ........ 359/629–634, 359/618, 411, 473; 345/7–9, 53; 351/111, 351/112, 157; 348/115
See application file for complete search history.

(56) References Cited

U.S. PATENT DOCUMENTS

| 5,266,930 | A | * | 11/1993 | Ichikawa et al. ............... 345/8 |
| 6,034,653 | A | * | 3/2000 | Robertson et al. ............. 345/8 |
| 6,144,347 | A | * | 11/2000 | Mizoguchi et al. ............ 345/8 |
| 6,486,855 | B1 | * | 11/2002 | Pandolfi ......................... 345/7 |

FOREIGN PATENT DOCUMENTS

| JP | 07-209600 | 8/1995 |
| WO | WO 01/06298 A1 | 1/2001 |

OTHER PUBLICATIONS

English Language Abstract of JP-A-7-209600.
International Search Report.

* cited by examiner

Primary Examiner—Loha Ben
(74) Attorney, Agent, or Firm—Michael Bednarek; Paul, Hastings, Janofsky & Walker LLP

(57) ABSTRACT

To provide an image display device of the type that presents images in a certain part of the field of vision in which the image display device can be used for prolonged periods of time.

An image display device 1 includes a main body 10 having a shape of a glasses frame, a right-eye display device 20R and a left-eye display device 20L. Each of the right-eye display device 20R and the left-eye display device 20L is for displaying a predetermined image and is provided in such a manner that it is not very clearly visible for a user when the user wearing the main body 10 on his or her head looks straight ahead and that it becomes clearly visible for the user only when the user moves his or her forward-looking eyes away. The user can get a forward field of vision and can see the images displayed on the right-eye display device 20R and the left-eye display device 20L when he or she looks at 45 degrees down. The right-eye display device 20R and the left-eye display device 20L may be fixed to the main body 10 at a spacing corresponding to the distance between the eyes of the user.

11 Claims, 4 Drawing Sheets

IMAGE DISPLAY DEVICE

TECHNICAL FIELD

The present invention relates to a small image display device that can be used while worn on the head.

BACKGROUND OF THE INVENTION

Head mounted displays (HMDs), which are used while worn on the head to place a video screen in front of each eye of the user, find applications in various fields including the field of virtual reality. Typical HMDs are designed in the shape of a frame of goggles or large glasses that block but outside light and force the user to see only the HMD's pictures. With an HMD used, the user can view images irrespective of the direction he or she faces but then again it gives the user visual isolation from the surrounding environment.

In recent years, small image display devices have been proposed that allow users to view both images and the surrounding environment by means of presenting the images in a certain part of the field of vision.

The image display device of this type is disclosed in, for example, Japanese patent laid-open document (JP-A-7-209600). This image display device has a liquid crystal display (LCD), a reflecting mirror, an ocular lens and other components contained within a single housing. The housing has a clip attached thereto. This clip is used for mounting the image display device onto a glasses or sunglasses frame. The housing is placed on top of either right or left lens of the glasses over the outside surface of it. An image that is displayed on the LCD is directed to one eye of the user in a diagonal down direction through the reflecting mirror, the ocular lens, and the lens of the glasses.

The image display device of this type provides the user with a choice between seeing the surrounding environment and seeing images by the movement of the eyes. It has a high value in terms of its availability in everyday life at any place both inside and outside a building.

This image display device has, however, something to be improved.

The first problem lies in a necessity for users of the image display device to move their eyes up in order to see an image.

The second problem is that images are seen with only one eye in this image display device.

Lifting the eye(s) and seeing images with one eye both often trigger user eyestrain and place a heavy burden on the beholding user. Therefore, this image display device is not suited for use for prolonged periods of time.

There has been no image display device of the type that presents images in a certain part of the field of vision in which the image display device solves the aforementioned problems and gives a user the opportunity of its use for prolonged periods of time, in particular a long-time viewing of images.

An object of the present invention is to provide an image display device of the type that presents images in a certain part of the field of vision in which the image display device can be used for prolonged periods of time.

SUMMARY OF THE INVENTION

An image display device that solves the aforementioned problem is as follows.

An image display device of the present invention comprises a main body that can be worn on the head of a user, and display means for displaying a predetermined image, said display means being provided on or in said main body in such a manner that it is not very clearly visible for said user when said user wearing said main body on his or her head looks straight ahead, and that it becomes clearly visible for said user when said user moves his or her eyes down at an angle equal to or larger than 20 degrees. When said user wearing said main body on his or her head looks straight ahead, it offers good visibility for said user.

Because this image display device offers good visibility for said user when said user wearing said main body on his or her head looks straight ahead, it can be used in everyday life at any place both inside and outside a building.

Because said display means of this image display device for displaying a predetermined image is provided on or in said main body in such a manner that said display means becomes clearly visible for said user (said user gets a clear vision of images produced by said display means) only when said user moves his or her eyes down at an angle equal to or larger than 20 degrees, this image display device causes less user eyestrain and is suited for use for prolonged periods.

User eye strain can be reduced by means of providing said display means in such a manner that it becomes clearly visible for said user only when said user moves his or her eyes down at an angle equal to or larger than 20 degrees, because of the following reasons.

One's downward looking at something (with his or her face facing the front) below his or her horizontal line of sight activates the parasympathetic nervous system. On the other hand, one's upward looking at something (with his or her face facing the front) above his or her horizontal line of sight activates the sympathetic nervous system.

To put it simply, the parasympathetic nervous system is active during sleep. It acts to conserve body energy. The sympathetic nervous system is active during waking hours. It acts to use energy. Stimulation of the parasympathetic nervous system results in low blood pressure, pupil constriction, slow heart rate and breathing, and increase in gastrointestinal motility. On the contrary, sympathetic stimulation results in high blood pressure, pupil dilation, fast heart rate and breathing, and decrease in gastrointestinal motility.

As apparent from the above, one can activate his or her parasympathetic nervous system by looking at something below his or her horizontal line of sight, thereby to achieve a relaxed state.

Said display means in said image display device according to the present invention is positioned in such a manner that it becomes clearly visible for said user only when said user moves his or her eyes down at an angle equal to or larger than 20 degrees. A natural consequence of this is that said display means is always looked at with downcast eyes. The parasympathetic nervous system activated thereby promotes a relaxed state in looking at an image, which allows said user to see images without causing eyestrain.

Said display means becomes clearly visible for said user only when said user moves his or her eyes down at an angle equal to or larger than 20 degrees for the following reasons. Downcast eyes to this extent are necessary in order to activate the parasympathetic nervous system. Said display means, if within a forward field of vision, will obstruct the user's view of the surrounding environment when said user looks straight ahead, which affects his or her everyday living.

As described above, said display means just has to be clearly visible for said user only when said user moves his or her eyes down at an angle equal to or larger than 20 degrees. However, it may be provided on or in said main body in such a manner that it becomes clearly visible for said user only when said user moves his or her eyes down at an angle between 20 degrees and 70 degrees, both inclusive. It is difficult to look down at an angle larger than 70 degrees, so that a user forced to do so would feel even more eyestrain.

Said display means may be provided on or in said main body in such a manner that it becomes clearly visible for said user only when said user moves his or her eyes down at approximately 45 degrees. The user eyestrain can be minimized under the condition that the angle at which said user moves his or her eyes down to see images is approximately 45 degrees.

As described above, said display means is provided on or in said main body in such a manner that it becomes clearly visible for said user only when said user moves his or her eyes down at an angle equal to or larger than 20 degrees. The phrase "becomes clearly visible for the user when the user moves his or her eyes down at an angle equal to or larger than 20 degrees" as used herein includes both the case that the user's eyes catch an image upon the right-angled movement of the user's straight-looking eyes to the ground and the case that the user's eyes catch an image upon the diagonal movement of the user's eyes.

Said display means of the present invention just has to be provided on or in said main body at a position as described above. It may be anything that can display images. A mechanism/structure for image production is not specifically limited but said display means may comprise, for example, a display screen on which images are shown and an optical system to guide an image shown on said display screen to the eye(s) of said user. In this case, said display means may be provided on or in said main body in such a manner that the optical axis of said optical system generally overlaps the line of sight of said user when said user moves his or her eyes down at an angle equal to or larger than 20 degrees and said display means becomes clearly visible for said user. This offers said user easy seeing of said images on said display means with less eyestrain when he or she moves his or her eyes down to said display means.

Said display means may be a single component or alternatively, it may be a combination of right-eye display means for the right eye of said user and left-eye display means for the left eye of said user. Using these two display means further reduces eyestrain which otherwise would be caused when said user looks at images.

Each of said right-eye display means and said left-eye display means becomes clearly visible for said user only when said user moves his or her eyes down at an angle equal to or larger than 20 degrees.

Said right-eye display means may be provided on or in said main body in such a manner that it is caught by the right eye of said user only when said user moves his or her right eye down at an angle between 20 degrees and 70 degrees, both inclusive. Said left-eye display means may be provided on or in said main body in such a manner that it is caught by the left eye of said user only when said user moves his or her left eye down at an angle between 20 degrees and 70 degrees, both inclusive. Said user who is forced to look down at an angle larger than 70 degrees would feel eyestrain associated with seeing images, which can be avoided with the aforementioned configuration.

Said right-eye display means may be provided on or in said main body in such a manner that it is caught by the right eye of said user only when said user moves his or her tight eye down at an angle of approximately 45 degrees. Said left-eye display means may be provided on or in said main body in such a manner that it is caught by the left eye of said user only when said user moves his or her left eye down at an angle of, approximately 45 degrees. This can be expected to minimize the user eyestrain associated with seeing images.

Said right-eye display means is designed in such a manner that it is caught by the right eye of said user only when said user moves his or her forward-looking right eye down. In this case, the phrase "moves his or her forward-looking right eye down" as used herein includes both the case of the right-angled movement of the user's forward-looking right eye down and the case of the diagonal movement of the eye. The same applies to said left-eye display means.

Details of said right-eye display means and said left-eye display means are not specifically limited as far as they can display predetermined images. However, each of them may comprise, for example, a display screen on which images are shown and an optical system to guide an image shown on said display screen to the eye(s) of said user. In this case, said right-eye display means may be provided on or in said main body in such a manner that the optical axis of said optical system generally-overlaps the line of sight of the right eye of said user when said user moves his or her right eye down at an angle equal to or larger than 20 degrees and said right-eye display means is caught by the right eye of said user. Said left-eye display means may be provided on or in said main body in such a manner that the optical axis of said optical system generally overlaps the line of sight of the left eye of said user when said user moves his or her left eye down at an angle equal to or larger than 20 degrees and said left-eye display means is caught by the left eye of said user. This offers said user easy seeing of said images on said right-eye display means and said left-eye display means with less eyestrain when he or she moves his or her eyes down to said display means.

Said main body may have any one of suitable shapes. The only requirements are that said display means can be provided on or in said main body and that said main body does not obstruct the user's field of vision when said user wearing said main body on his or her head looks straight ahead.

Said main body may have a shape of, for example, glasses. The shape of glasses in this case includes a shape of goggles.

Said main body having a shape of glasses may comprise a glasses frame having a lower segment. In this case, said display means may be provided on or in said lower segment of said glasses frame. When said display means includes said right-eye display means and said left-eye display means, said right-eye display means may be provided on or in said lower segment corresponding to the right eye whereas said left-eye display means may be provided on or in said lower segment corresponding to the left eye.

When having a shape of glasses, said main body may be fitted around lenses of said glasses. In this case, said display means may be provided at a lower end of said lens of said glasses. When said display means includes said right-eye display means and said left-eye display means, said right-eye display means may be provided at a lower end of the right lens of said glasses whereas said left-eye display means may be provided at a lower end of the left lens of said glasses. Said glasses as used here in may be either prescription glasses or not. In addition, right and left lenses of said glasses may be connected in series.

BEST MODE FOR CARRYING OUT THE INVENTION

Figure 1:
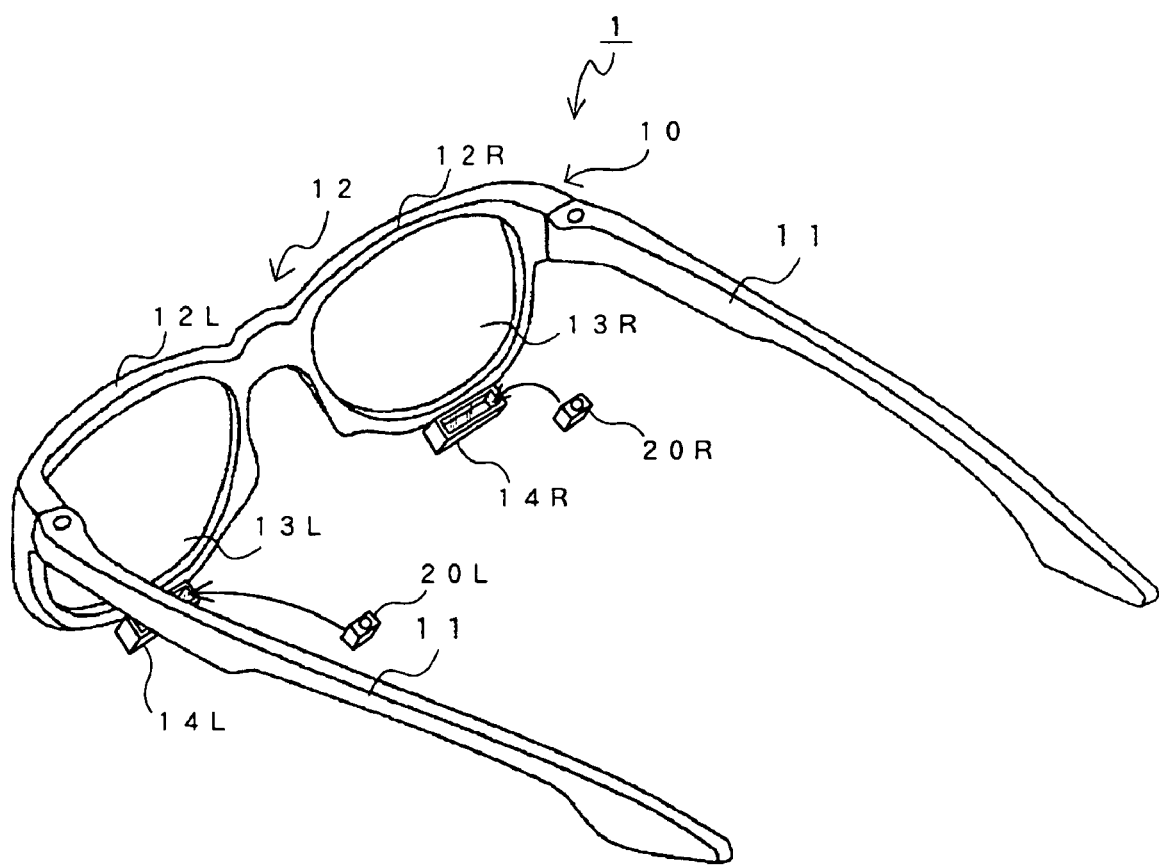
FIG. 1 is a perspective view showing the whole of an image display device according to a first embodiment, seen from the back.

First and second preferred embodiments of the present invention are described in detail below with reference to the drawing.

In the description of these embodiments, same components and parts are represented by the same reference numerals. A redundant description may be omitted.

<<First Embodiment>>

FIG. 1 is a perspective view showing the whole of an image display device 1, seen from the back, according to a first embodiment of the present invention.

This image display device 1 comprises a main body 10, and a right-eye display device 20R and a left-eye display device 20L for displaying images.

The main body 10 in this embodiment has a shape of, but not limited to, a glasses frame. It comprises temples 11 and a frame 12.

The image display device 1 is used while worn on the head of a user. The temples 11 fit over the user's ears to keep the image display device 1 on the head of the user.

The frame 12 includes a right-eye frame 12R and a left-eye frame 12L. The right-eye frame 12R is a frame segment that rests in front of the right eye of the user when the image display device 1 is kept on the head of the user. The left-eye frame 12L is a frame segment that rests in front of the left eye of the user when the image display device 1 is mounted. While not necessarily being required, each of the frames 12L and 12R in this embodiment has a closed curved profile. Lower portions of the frames 12L and 12R serve as lower segments of the present invention.

The right-eye frame 12R and the left-eye frame 12L in this embodiment are fitted around a right-eye lens 13R and a left-eye lens 13L, respectively. Each of the right-eye lens 13R and the left-eye lens 13L is a curved piece of non-prescription, colorless, and transparent glass. Of course, the right-eye lens 13R and the left-eye lens 13L may be prescription lenses or colored lenses. Alternatively, they may be made of a material other than glass, such as a resin. Furthermore, the right-eye lens 13R and the left-eye lens 13L may be omitted.

A right-eye socket 14R and a left-eye socket 14L are provided at respective lower portions of the right-eye frame 12R and the left-eye frame 12L. The right-eye socket 14R is for fixing the right-eye display device 20R to the main body 10 at a suitable position aligned with the right eye of the user. The left-eye socket 14L is for fixing the left-eye display device 20L to the main body 10 at a suitable position aligned with the left eye of the user.

As will be described below, the right-eye socket 14R and the left-eye socket 14L in this embodiment are adapted to support the right-eye display device 20R and the left-eye display device 20L, respectively, at a predetermined angle above the horizontal.

Figure 2:
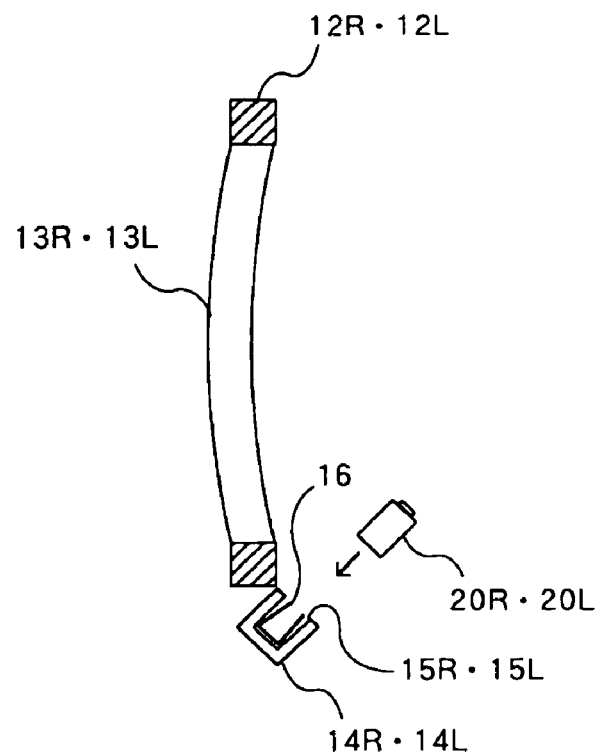
FIG. 2 is a side cross-sectional view showing a structure of a right-eye socket and a left-eye socket in the image display device shown in FIG. 1.

Each of the right-eye socket 14R and the left-eye socket 14L in this embodiment has a rectangular cross section with one surface opened to the air as openings 15R and 15L, as shown in FIG. 2. The right-eye display device 20R is fitted into the right-eye socket 14R through the opening 15R and fixed in the right-eye socket 14R accordingly. The left-eye display device 20L is fitted into the left-eye socket 14L through the opening 15L and fixed in the left-eye socket 14L accordingly.

In order to keep the right-eye display device 20R and the left-eye display device 20L at a predetermined angle above the horizontal, the openings 15R and 15L in the right-eye socket 14R and the left-eye socket 14L, respectively, according to this embodiment are each inclined at a predetermined angle above the horizontal.

For the purpose of firmly holding the right-eye display device 20R, the opening 15R in the right-eye socket 14R has a width (the length of the opening 15R along the latitudinal direction thereof) that is approximately equal to the length of the right-eye display device 20R along the vertical direction thereof ("the vertical direction of the right-eye display device 20R" refers to the length of the right-eye display device 20R along the vertical direction thereof in the case where which side of the right-eye display device is laid along the vertical direction and which side along the horizontal direction are predetermined; this will be described below). Therefore, inserting the right-eye display device 20R into the right-eye socket 14R through the opening 15R requires some force. The right-eye display device 20R inserted into the right-eye socket 14R through the opening 15R has a perfect fit in the right-eye socket 14R. Likewise, for the purpose of firmly holding the left-eye display device 20L, the opening 15L in the left-eye socket 14L has a width (the length of the opening 15L along the latitudinal direction thereof) that is approximately equal to the length of the left-eye display device 20L along the vertical direction thereof ("the vertical direction of the left-eye display device 20L" refers to the length of the left-eye display device 20L along the vertical direction thereof in the case where which side of the left-eye display device is laid along the vertical direction and which side along the horizontal direction are predetermined; this will be described below). Therefore, inserting the left-eye display device 20L into the left-eye socket 14L through the opening 15L requires some force. The left-eye display device 20L inserted into the left-eye socket, 14L through the opening 15L has a perfect fit in the left-eye socket 14L.

In the case described above, the right-eye display device 20R is held between two opposed plates that are provided on the upper and lower sides of the right-eye socket 14R. The left-eye display device 20L is held between two opposed plates that are provided on the upper and lower sides of the left-eye socket 14L.

While not necessarily being required, a leaf spring 16 as shown in FIG. 2 is disposed inside the right-eye socket 14R and the left-eye socket 14L in this embodiment with a view to holding the right-eye display device 20R and the left-eye display device 20L more firmly. The leaf spring is bent to have a generally trapezoid shape in cross section with the narrower end opened to the air. The right-eye display device 20R and the left-eye display device 20L are inserted into a gap defined by the opposite sloping sides of their corresponding leaf spring 16. As a result, the right-eye display device 20R and the left-eye display device 20L are pressed against the opposite sloping sides of the leaf spring 16. This ensures a perfect fit of the right-eye display device 20R in the right-eye socket 14R as well as a perfect fit of the left-eye display device 20L in the left-eye socket 14L.

The length of the right-eye socket 14R along the longitudinal direction thereof is longer than the length of the right-eye display device 20R along the horizontal direction thereof ("the horizontal direction of the right-eye display device 20R" refers to the length of the right-eye display device 20R along the horizontal direction thereof in the case where which side of the right-eye display device is laid along the vertical direction and which side along the horizontal direction are predetermined; this will be described below). Therefore, the right-eye display device 20R can be held within the right-eye socket 14R at a suitable position in the right-eye socket 14R along the longitudinal direction thereof. This position is determined so that a predetermined relative alignment is achieved between the right-eye display device 20R and the right eye of the user. Likewise, the length of the left-eye socket 14L along the longitudinal direction thereof is longer than the length of the left-eye display device 20L along the horizontal direction thereof ("the horizontal direction of the left-eye display device 20L" refers to the length of the left-eye display device 20L along the horizontal direction thereof in the case where which side of the left-eye display device is laid along the vertical direction and which side along the horizontal direction are predetermined; this will be described below). Therefore, the left-eye display device 20L can be held within the left-eye socket 14L at a suitable position in the left-eye socket 14L along the longitudinal direction thereof. This position is determined so that a predetermined relative alignment is achieved between the left-eye display device 20L and the left eye of the user.

The positioning of the right-eye display device 20R and the left-eye display device 20L makes it possible to align the right-eye display device 20R and the left-eye display device 20L with the eyes of the user.

Figure 3:
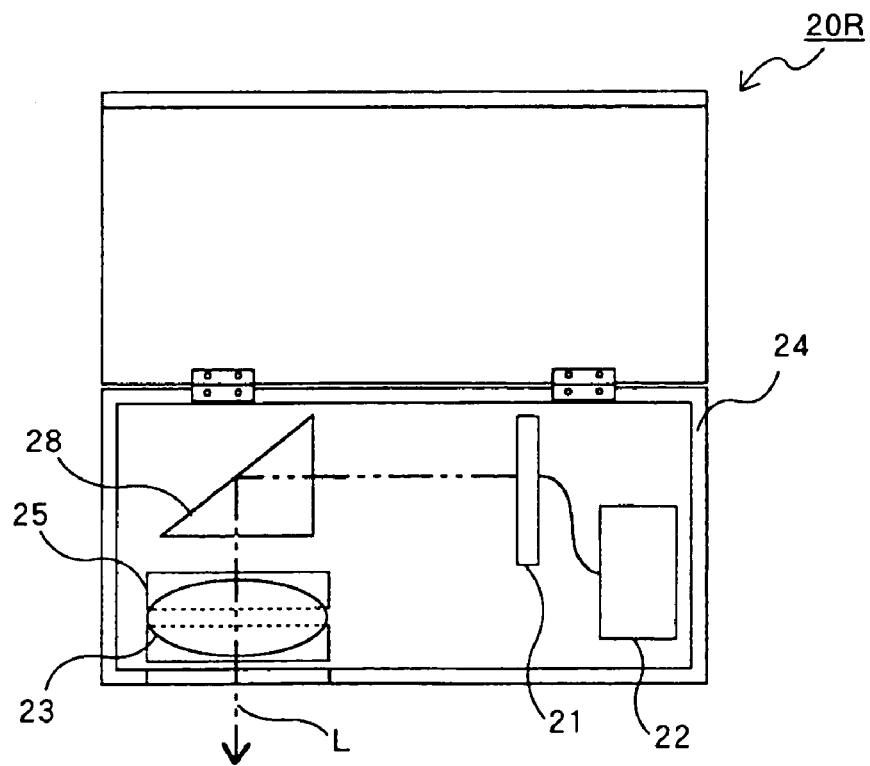
FIG. 3 is a plan view showing a structure of a right-eye display device in the image display device shown in FIG. 1.

Next, a structure of the right-eye display device 20R and the left-eye display device 20L is described mainly with reference to FIG. 3. The right-eye display device 20R and the left-eye display device 20L in this embodiment are arranged in, but not limited to, a bilaterally symmetric fashion. Thus, only the right-eye display device 20R is described below. No description will be made about a structure of the left-eye display device 20L.

The right-eye display device 20R includes a display screen 21, a controller 22, and an imaging lens 23, as shown in FIG. 3. While not necessarily being required, these components are contained in a storage box 24 having a rectangular parallelepiped shape in this embodiment. The right-eye display device 20R is formed as an integrated unit.

A line L shown in FIG. 3 indicates an optical path of the light traveling from the display screen 21 to the eye of the user.

The display screen 21 is a surface on which images are shown. A liquid crystal display is used for the display screen 21 in this embodiment from a viewpoint of easy downsizing.

The controller 22 is for controlling images to be displayed on the display screen 21. The controller 22 receives an image signal, such as a video signal or an RGB signal, by wire or wireless from the outside of the right-eye display device 20R, to produce images from the image signal on the display screen 21. The controller 22 is not required to be provided within the right-eye display device 20R. All or a part of it may be provided outside the right-eye display device 20R. In addition, the controller 22 may have a TV tuner. In such a case, the controller 22 receives an airwave for normal television broadcast and decodes it to produce TV pictures on the display screen 21. Images to be displayed on the display screen 21 by the controller 22 are not specifically limited to the above. Instead, they can be various kinds of images including those reproduced from image data that are stored on a storage medium such as a DVD, as well as those reproduced from image data that are generated by a computer such as a personal computer or a gaming device.

The imaging lens 23 is for directing an image shown on the display screen 21 to the eye of the user and focusing the image on the eye. The front surface of the storage box 24 (one of the surfaces of the storage box that faces the eye of the user during use) has a hole formed therein. A part of the imaging lens 23 is exposed through the hole. While the imaging lens 23 in this embodiment is illustrated as a single lens, it may be a combination of two or more lenses.

Figure 4:
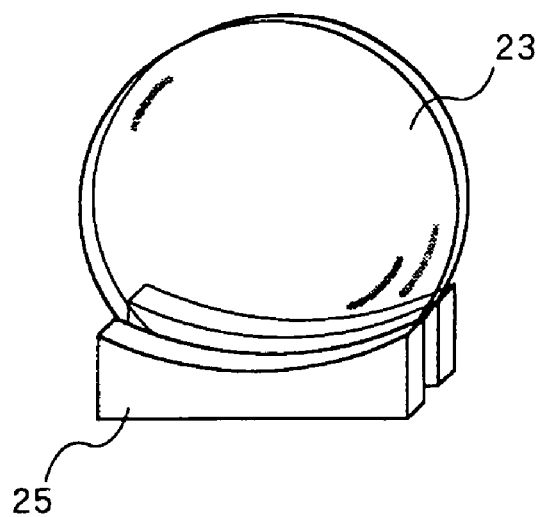
FIG. 4 is a perspective view showing a mechanism of fixing an imaging lens used in the right-eye display device shown in FIG. 3.

While not necessarily being required, this embodiment offers choices of the imaging lens 23. This choice depends upon the vision of the user (more specifically, the vision in the right eye). Any one of suitable mechanisms may be used to allow for choices of the imaging lens 23. In this embodiment, a configuration as shown in FIGS. 3 and 4 is used to allow for choices of the imaging lens 23. As shown in FIG. 3, the storage box 24 in this embodiment has a top surface that can be opened and closed using, for example, a hinge. The storage box also has a lens holder 25 on the inner bottom thereof. The lens holder has a gap in which the imaging lens 23 rests and is supported from below. Different imaging lenses 23 are made available to accommodate individual differences in vision of users. One of them is picked out according to the results of a visual acuity test. The top surface of the storage box 24 is opened, and the selected imaging lens 23 is slid into the lens holder 25. In this way, an imaging lens 23 can be selected and fitted.

Figure 5:
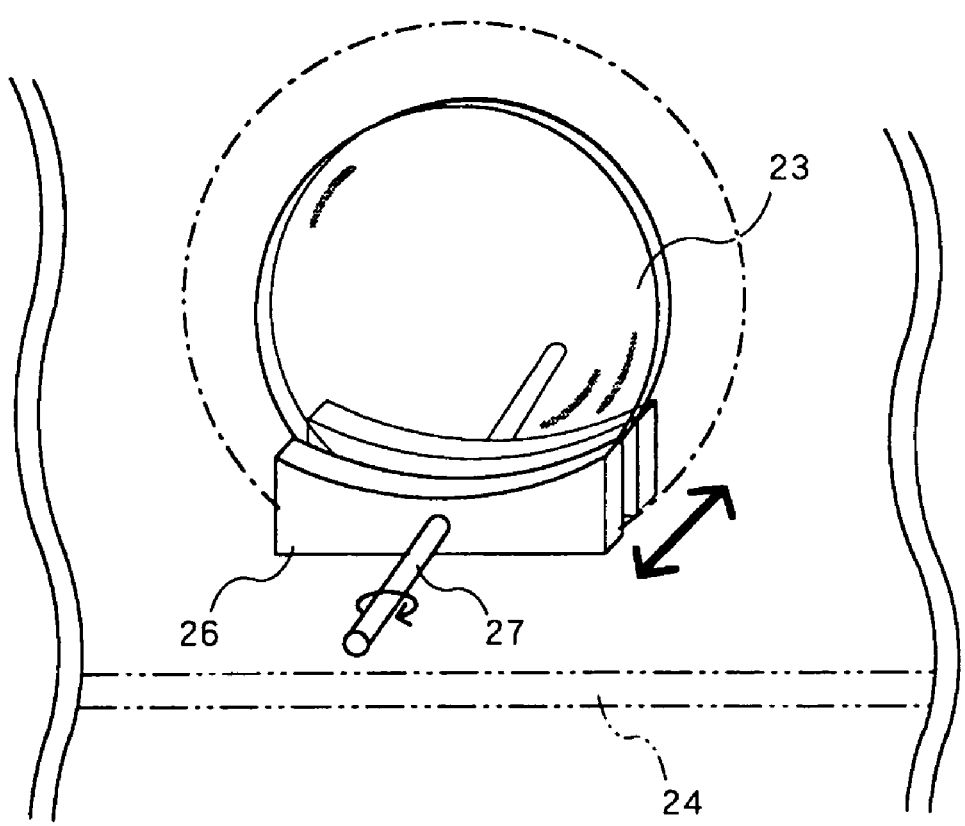
FIG. 5 is a perspective view showing another example of a mechanism of fixing an imaging lens used in the right-eye display device shown in FIG. 3.

The aforementioned choices of the lens are for appropriately focusing images displayed on the display screen 21 on the retina of the right eye of the user. However, the images displayed on the display screen 21 may appropriately be focused on the retina by means of providing positional options for the imaging lens 23 in such a manner that the imaging lens can be fixed at a certain position on an optical path between the display screen 21 and the retina, rather than by offering choices of the lens. This can be configured as follows (see FIG. 5). In this case, the storage box 24 has a top surface that can be opened and closed. The storage box 24 also has a lens holder 26 on the inner bottom thereof to hold the imaging lens 23. A threaded hole is formed in the lens holder 26 to pass through the lens holder 26 at a lower portion thereof along the optical axis of the imaging lens 23. A bolt 27 screws into the hole, passing through it. The bolt 27 also passes through the storage box 24. A slotted-head or Phillips head of the bolt exposes outside the storage box 24.

With this configuration, it becomes possible to move the lens holder 26 and the imaging lens 23 forward and backward along the optical axis by placing a screwdriver in the slot in the head and turning the bolt 27 in an appropriate direction. Appropriate selection of the direction and angle of rotation of the bolt 27 achieves positioning of the imaging lens 23 along the optical axis.

To make the positioning meaningful, the right-eye display device 20R is fitted into the right-eye socket 14R in a predetermined orientation. The approximate up-and-down direction at that time, i.e., the direction perpendicular to the surface of FIG. 3 corresponds to the vertical direction of the right-eye display device 20R. The right-and-left direction at that time, i.e., the right-and-left direction of FIG. 3 corresponds to the horizontal direction of the right-eye display device 20R. The lengths in these directions are the length of the right-eye display device 20R along the vertical direction thereof and the length of the right-eye display device 20R along the horizontal direction thereof. The same applies to the left-eye display device 20L.

The right-eye display device 20R may have a reflector that is provided between the display screen 21 and the eye and that directs the light coming out of the display screen 21 by reflection. The reflector increases freedom of positioning of the display screen 21, the imaging lens 23, and the eye. The right-eye display device 20R in this embodiment has a reflector 28. While a mirror or a prism may be used as the reflector 28, a prism serves as the reflector 28 in this embodiment. The reflector 28 in this embodiment is provided between the display screen 21 and the imaging lens 23 to turn the light at 90 degrees. In other words, in this embodiment, the light that comes out of the display screen 21 is reflected from the reflector 28 and then focused on the retina of the right eye of the user after passing through the imaging lens 23.

How to use this image display device 1 is described.

In using this image display device 1, it is necessary to attach the right-eye display device 20R and left-eye display device 20L to the main body 10. Prior to this, the imaging lenses 23 in the right-eye display device 20R and the left-eye display device 20L should be adjusted.

The imaging lenses 23 are adjusted by means of choosing an imaging lens 23 according to the vision of the user or by means of moving the imaging lens 23. Since this embodiment offers choices of the imaging lens 23 as described above, adjustment of the imaging lens 23 is made by choosing an imaging lens 23.

Adjustment of the imaging lens 23 is made by: measuring the vision of the right and left eyes of the user, choosing an imaging lens 23 for the right eye and an imaging lens 23 for the left eye that are suitable for the vision, and fitting the imaging lenses 23 for the right and left eyes into the respective lens holders 25 within the right-eye display device 20R and the left-eye display device 20L, respectively.

In the aforementioned case where the imaging lens 23 can be positioned and fixed appropriately on the optical path between the display screen 21 and the retina, the imaging lens 23 provided within the right-eye display device 20R is positioned and fixed at a certain point on the optical path that is suited for the vision in the right eye of the user, and the imaging lens 23 provided within the left-eye display device 20L is positioned and fixed at a certain point on the optical path that is suited for the vision in the left eye of the user. When the mechanism used to position and fix the imaging lens 23 appropriately on the optical path between the display screen 21 and the retina is the one as described above, appropriate adjustment of the direction and angle of, rotation of the bolts 27 results in positioning and fixing of the imaging lenses 23 within the right-eye display device 20R and the left-eye display device 20L.

The imaging lens 23 is thus adjusted.

Next, the right-eye display device 20R and the left-eye display device 20L are attached to the main body 10.

This attachment is made by fitting the right-eye display device 20R and the left-eye display device 20L into the right-eye socket 14R and the left-eye socket 14L, respectively, while adjusting their position so that they are aligned with the eyes of the user. Alignment of the right-eye display device 20R and the left-eye display device 20L with the eyes of the user can be performed more easily if the distance between the eyes of the user is measured before aligning the eyes of the user with the right-eye display device 20R and the left-eye display device 20L and the display devices are fitted into their respective sockets according to the measurement.

The image display device 1 having the right-eye display device 20R and the left-eye display device 20L attached to the main body 10 is used while worn on the head of the user as in normal glasses. To mount the image display device 1 on the head, the two temples 11 of the main body 10 are fitted over the user's ears to keep it on.

In this state, the user can get a clear vision of images displayed on the right-eye display device 20R and the left-eye display device 20L with his or her right and left eyes, respectively, of his or her own will.

It should be noted that the right-eye display device 20R and the left-eye display device 20L are provided at a lower segment of the right-eye frame 12R and the left-eye frame 12L of the main body 10 having a shape of a glasses frame, so that the right eye of the user cannot catch the image displayed on the right-eye display device 20R and the left eye of the user cannot catch the image displayed on the left-eye display device 20L as long as the user looks straight ahead. This means that the image display device 1 while worn on the head enables the user to get a forward field of vision to the extent that he or she is wearing normal glasses. A normal field of vision is available at least as long as the user looks straight ahead. Wearing this image display device 1 on the head does not work against everyday life of the user.

On the other hand, the right eye of the user wearing the image display device 1 on his or her head can catch the image displayed on the right-eye display device 20R and the left eye of the user can catch the image displayed on the left-eye display device 20L when the user moves his eyes down. The downcast angle is determined so that the imaging lens 23 exposed over the right-eye display device 20R faces the pupil of the right eye and the imaging lens 23 exposed over the left-eye display device 20L faces the pupil of the left eye.

Figure 6:
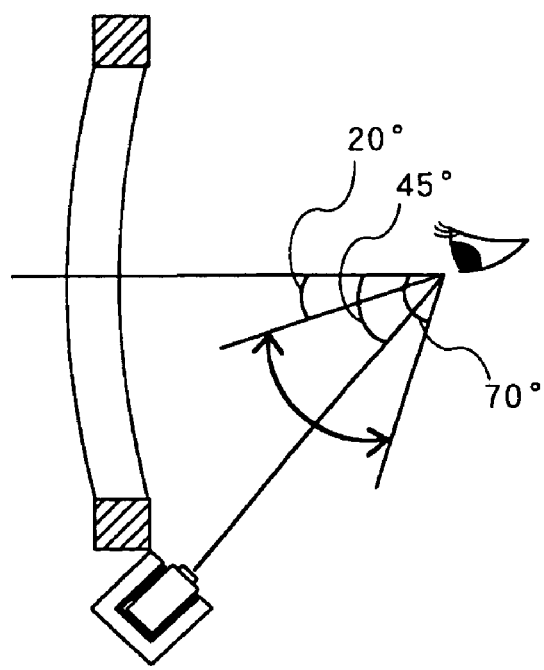
FIG. 6 is a side view schematically illustrating the relation between the right-eye display device and the right eye as well as the relation between the left-eye display device and the left eye during the use of the image display device shown in FIG. 1.

In this embodiment, the right eye can catch the image displayed on the right-eye display device 20R whereas the left eye can catch the image displayed on the left-eye display device 20L when the user looks down at an angle of, but not limited to, 45 degrees with his or her head facing the front (see FIG. 6). This angle is preferably at least 20 degrees in order to give a normal field of vision of the user during the time when the user does not look at the images displayed on the right-eye display device 20R and the left-eye display device 20L. The aforementioned angle is preferably not larger than 70 degrees because an unduly large angle prevents the user's easy seeing of the images displayed on the right-eye display device 20R and the left-eye display device 20L. The right-eye socket 14R and the left-eye socket 14L are attached to the lower segments of the right-eye frame 12R and the left-eye frame 12L, respectively, at an angle within the aforementioned range.

The light that comes out of the display screen 21 upon production of images on the display screen 21 under the control of the controller 22 is reflected from the reflector 28 and focused on the retina of the right or left eye of the user after passing through the imaging lens 23. The image is thus clearly visible for the user.

<<Second Embodiment>>

Figure 7:
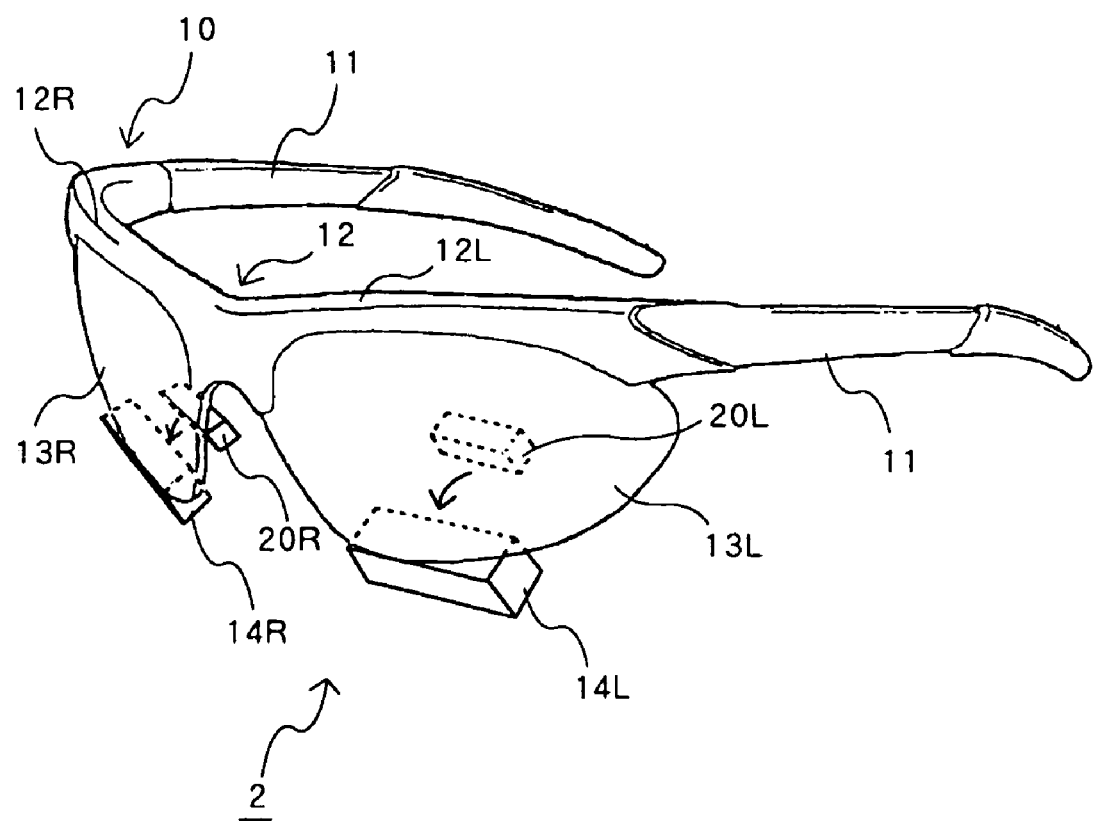
FIG. 7 is a perspective view showing the whole of an image display device according to a second embodiment, seen from the front.

FIG. 7 is a perspective view showing the whole of an image display device 2, seen from the front, according to a second embodiment of the present invention.

The image display device 2 comprises a main body 10, and a right-eye display device 20R and a left-eye display device 20L for displaying images as in the image display device 1 of the first embodiment.

The image display device 2 has a structure similar to that of the image display device 1 of the first embodiment. A way of using it is also similar. In particular, details of the right-eye display device 20R and the left-eye display device 20L are completely same as those in the image display device 1 of the first embodiment.

The difference between the image display device 2 of the second embodiment and the image display device 1 of the first embodiment lies in the structure of their main bodies 10 and the mechanism that is used to attach the right-eye socket 14R and the left-eye socket 14L to the main body 10.

The main body 10 of the image display device 2 comprises temples 11, a frame 12 having a right-eye frame 12R and a left-eye frame 12L, and a right-eye lens 13R and a left-eye lens 13L as in the image display device 1 of the first embodiment. However, unlike the image display device 1 of the first embodiment, the right-eye frame 12R and the left-eye frame 12L do not have a closed curved profile. In addition, they do not have lower segments that the image display device 1 of the first embodiment has.

Therefore, this image display device 2 cannot afford to fix the right-eye socket 14R and the left-eye socket 14L into the lower segments of the frame, which can be done in the image display device 1 of the first embodiment. Taking the above into consideration, in the image display device 2, the right-eye socket 14R is attached to the lower end of the right-eye lens 13R whereas the left-eye socket 14L is attached to the lower end of the left-eye lens 13L.

The structure of the right-eye socket 14R and the left-eye socket 14L, and the angle at which they are attached are similar to those of the image display device 1 of the first embodiment.

The invention claimed is:

1. An image display device comprising:
a main body that can be worn on the head of a user; and display means for
displaying a predetermined image, said display means being provided on or in said main body in such a manner that it is not very clearly visible for said user when said user wearing said main body on his or her head looks straight ahead, and that it becomes clearly visible for said user when said user moves his or her eyes down at an angle equal to or larger than 20 degrees; said image display device offers good visibility for said user when said user wearing said main body on his or her head looks straight ahead,
wherein said display means comprises a display screen on which images are shown and an optical system to guide an image shown on said display screen to the eye(s) of said user, said display means being provided on or in said main body in such a manner that the optical axis of said optical system generally overlaps the line of sight of said user when said user moves his or her eyes down at an angle equal to or larger than 20 degrees and said display means becomes clearly visible for said user.

2. The image display device as claimed in claim 1, wherein said display means is provided on or in said main body in such a manner that it becomes clearly visible for said user only when said user moves his or her eyes down at an angle between 20 degrees and 70 degrees, both inclusive.

3. The image display device as claimed in claim 1, wherein said display means is provided on or in said main body in such a manner tat it becomes clearly visible for said user only when said user moves his or her eyes down at approximately 45 degrees.

4. The image display device as claimed in claim 1, wherein said display means is provided on or in said main body in such a maimer that it becomes clearly visible for said user only when said user moves his or her straight-looking eyes down.

5. An image display device comprising:
a main body that can be worn on the head of a user, and display means for
displaying a predetermined image, said display means being provided on or in said main body in such a manner that it is not very clearly visible for said user when said user wearing said main body on his or her head looks straight ahead, and that it becomes clearly visible for said user when said user moves his or her eyes down at an angle equal to or larger than 20 degrees;
said image display device offers good visibility for said user when said user wearing said main body on his or her head looks straight ahead,
wherein said display means includes right-eye display means for the right eye of said user and left-eye display means for the left eye of said user,
wherein each of said right-eye display means and said left-eye display means comprises a display screen on which images are shown and an optical system to guide an image shown on said display screen to the eye (s) of said user; said right-eye display means being provided on or in said main body in such a manner that the optical axis of said optical system generally overlaps the line of sight of the right eye of said user when said user moves his or her right eye down at an angle equal to or larger than 20 degrees and said right-eye display means is caught by the right eye of said user, said left-eye display means being provided on or in said main body in such a manner that the optical axis of said optical system generally overlaps the line of sight of the left eye of said user when said user moves his or her left eye down at an angle equal to or larger than 20 degrees and the left-eye display means is caught by the left eye of said user.

6. The image display device as claimed in claim 5, wherein said right-eye display means is provided on or in said main body in such a manner that it is caught by the right eye of said user only when said user moves his or her right eye down at an angle between 20 degrees and 70 degrees, both inclusive and wherein said left-eye display means is provided on or in said main body in such a manner that it is caught by the left eye of said user only when said user moves his or her left eye down at an angle between 20 degrees and 70 degrees, both inclusive.

7. The image display device as claimed in claim 5, wherein said right-eye display means is provided on or in said main body in such a manner that it is caught by the right, eye of said user only when said user moves his or her right eye down at an angle of approximately 45 degrees and wherein said left-eye display means is provided on or in said main body in such a manner that it is caught by the left eye of said user only when said user moves his or her left eye down at an angle of approximately 45 degrees.

8. The image display device as claimed in claim 5, wherein said right-eye display means is provided on or in said main body in such a manner that it is caught by the right eye of said user only when said user moves his or her forward-looking right eye down and said left-eye display means is provided on or in said main body in such a manner that it is caught by the left eye of said user only when said user moves his or her forward-looking left eye down.

9. An image display device comprising:
a main body that can be worn on the head of a user, and display means for
displaying a predetermined image, said display means being provided on or in said main body in such a manner that it is not very clearly visible for said user when said user wearing said main body on his or her head looks straight ahead, and that it becomes clearly visible for said user when said user moves his or her eyes down at an angle equal to or larger than 20 degrees;
said image display device offers good visibility for said user when said user wearing said main body on his or her head looks straight ahead,
wherein said main body has a shape of glasses.

10. The image display device as claimed in claim 9, wherein said main body comprises a glasses frame having a lower segment, said display means being provided on or in said lower segment of said glasses frame.

11. The image display device as claimed in claim 9, wherein said main body is fitted around lenses of said glasses, said display means being provided at a lower end of said lenses of said glasses.

* * * * *